US012793385B2

(12) United States Patent
Wei et al.

(10) Patent No.: US 12,793,385 B2
(45) Date of Patent: Nov. 10, 2026

(54) METHOD AND APPARATUS WITH VIDEO OBJECT IDENTIFICATION

(71) Applicant: Samsung Electronics Co., Ltd., Suwon-si (KR)

(72) Inventors: Ping Wei, Xi'an (CN); Changkai Li, Xi'an (CN); Ruijie Zhang, Xi'an (CN); Yuxin Wang, Xi'an (CN); Huan Li, Xi'an (CN); Han Xu, Xi'an (CN); Ran Yang, Xi'an (CN); Yuanyuan Zhang, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 18/397,203

(22) Filed: Dec. 27, 2023

(65) Prior Publication Data

US 2024/0221356 A1 Jul. 4, 2024

(30) Foreign Application Priority Data

Dec. 30, 2022 (CN) ......................... 202211721668.6
Oct. 4, 2023 (KR) ........................ 10-2023-0131951

(51) Int. Cl.
*G06V 10/764* (2022.01)

(52) U.S. Cl.
CPC ................................. *G06V 10/764* (2022.01)

(58) Field of Classification Search
None
See application file for complete search history.

(56) References Cited

U.S. PATENT DOCUMENTS 10,127,668 B2 11/2018 Bak et al.
2015/0206026 A1* 7/2015 Kim ....................... G06V 10/50 382/170
2022/0036561 A1* 2/2022 Liu ...................... G06N 3/0464
2022/0319155 A1* 10/2022 Lu ........................ G06N 3/0455
2023/0074706 A1* 3/2023 Xiao .................. G06V 30/1444
2023/0206456 A1* 6/2023 Lee ...................... G06V 10/764 382/266

FOREIGN PATENT DOCUMENTS

KR 10-2022-0012733 A 2/2022

OTHER PUBLICATIONS

Tahir, Muhammad, and Saeed Anwar. "Transformers in pedestrian image retrieval and person re-identification in a multi-camera surveillance system." *Applied Sciences* 11.19 (Oct. 2, 2021):9197.
He, Shuting, et al. "Transreid: Transformer-based object re-identification. " *Proceedings of the IEEE/CVF international conference on computer vision.* (Mar. 26, 2021).

* cited by examiner

*Primary Examiner* — Leon Viet Q Nguyen
(74) *Attorney, Agent, or Firm* — NSIP Law

(57) ABSTRACT

A processor-implemented method including extracting initial feature maps from respective images extracted from a video, wherein the extracting of the initial features maps is performed using a transformer, generating a target feature map by fusing the initial feature maps using a feature fusion network including one or more layers, and identifying an object in the video based on the target feature map.

15 Claims, 8 Drawing Sheets

METHOD AND APPARATUS WITH VIDEO OBJECT IDENTIFICATION

CROSS-REFERENCE TO RELATED APPLICATIONS

This application claims the benefit under 35 USC § 119(a) of Chinese Patent Application No. 202211721668.6 filed on Dec. 30, 2022, in the China National Intellectual Property Administration, and Korean Patent Application No. 10-2023-0131951 filed on Oct. 4, 2023, in the Korean Intellectual Property Office, the entire disclosures of which are incorporated herein by reference for all purposes.

BACKGROUND

1. Field

The following description relates to a method and apparatus with video object identification.

2. Description of Related Art

Person re-identification (Re-ID) technology has become an area of research in the field of computer vision technology. Re-ID technology determines whether a certain person exists in an image sequence or a video using computer vision technology. Re-ID technology may be capable of identifying a certain object (e.g., a person) in videos captured by multiple cameras that cover several visual ranges that do not overlap with each other.

In some instances, because of a camera's particular limitation with respect to its capturing distance and resolution, it may not be possible to obtain a clear image of a person's face. In these instances, Re-ID may be able to identify a person based on the appearance of their entire body. However, the capability of entire-body identification performed by Re-ID technology may vary depending on factors such as that person's pose, degree of occlusion, the background, the viewing angle, and available lighting.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented method includes extracting initial feature maps from respective images extracted from a video, wherein the extracting of the initial features maps is performed using a transformer, generating a target feature map by fusing the initial feature maps using a feature fusion network including one or more layers, and identifying an object in the video based on the target feature map.

The identifying of the object in the video may include extracting classification feature information from a target feature map output from a last layer of the feature fusion network, obtaining a global feature vector of the video, obtaining a final feature vector of the video based on the classification feature information and the global feature vector, and identifying the object in the video based on the final feature vector.

The obtaining of the global feature vector of the video may include obtaining global feature vectors of the respective images, obtaining weights for of the respective global feature vectors, and obtaining the global feature vector of the video based on the weights and the global feature vectors.

The one or more layers may include one feature fusion module and fusion feature maps corresponding to an output of a current layer, an input of a next layer may include the fusion feature maps, and the fusion feature maps may be cascaded with the current layer.

The generating of the target feature map may include grouping fusion feature maps corresponding to an output of a current layer into groups of two, dividing the fusion feature maps into one or more sub-sets, inputting the one or more sub-sets to a next layer, and setting an output of the next layer as the target feature map when the next layer is a last layer of the one or more layers.

The one or more layers may include feature fusion modules, each feature fusion module including a self-attention module configured to output a self-attention feature map from each fusion feature map in an input sub-set, and a cross-attention module configured to output a cross-attention feature map by crossing a fusion feature map in the input sub-set.

The global feature vector may include supplementary information of the classification feature information extracted from the target feature map.

In a general aspect, a processor-implemented method includes extracting a plurality of images from a video, extracting initial feature maps from respective images extracted from a video, wherein the extracting is performed using a transformer, generating a target feature map by fusing the initial feature maps using a feature fusion network including one or more layers, obtaining a global feature vector of the video, and identifying an object in the video based on the target feature map and the global feature vector.

The global feature vector may be obtained from weighted average of global feature vectors extracted from the respective images.

In a general aspect, an electronic device includes one or more processors configured to execute instructions and a memory storing the instructions, the execution of the instructions configures the processors to extract a plurality of images from a video, extract initial feature maps from respective images extracted from a video, wherein the extracting of the initial features maps is performed using a transformer, generate a target feature map by fusing the initial feature maps using a feature fusion network including one or more layers, and identify an object in the video based on the target feature map.

The processors may be further configured to extract classification feature information from a target feature map output from a last layer of the feature fusion network, obtain a global feature vector of the video, obtain a final feature vector of the video based on the classification feature information and the global feature vector, and identify the object in the video based on the final feature vector.

The processors may be further configured to obtain global feature vectors of the respective images, obtain weights for the respective global feature vectors and obtain the global feature vector of the video based on the weights and the global feature vectors.

The one or more layers may include a feature fusion module and fusion feature maps corresponding to an output of a current layer, and an input of a next layer may include the fusion features maps and is cascaded with the current layer.

The processors may be further configured to group fusion feature maps corresponding to an output of a current layer into groups of two, divide the fusion feature maps into one or more sub-sets, input the one or more sub-sets to a next layer, and set an output the next layer as the target feature map when the next layer is a last layer of the one or more layers.

The one or more layers may include feature fusion modules, each feature fusion module including a self-attention module configured to output a self-attention feature map from each fusion feature map in an input sub-set and a cross-attention module configured to output a cross-attention feature map by crossing a fusion feature map in the input sub-set.

The global feature vector may include supplementary information of the classification feature information extracted from the target feature map.

Figure 1:
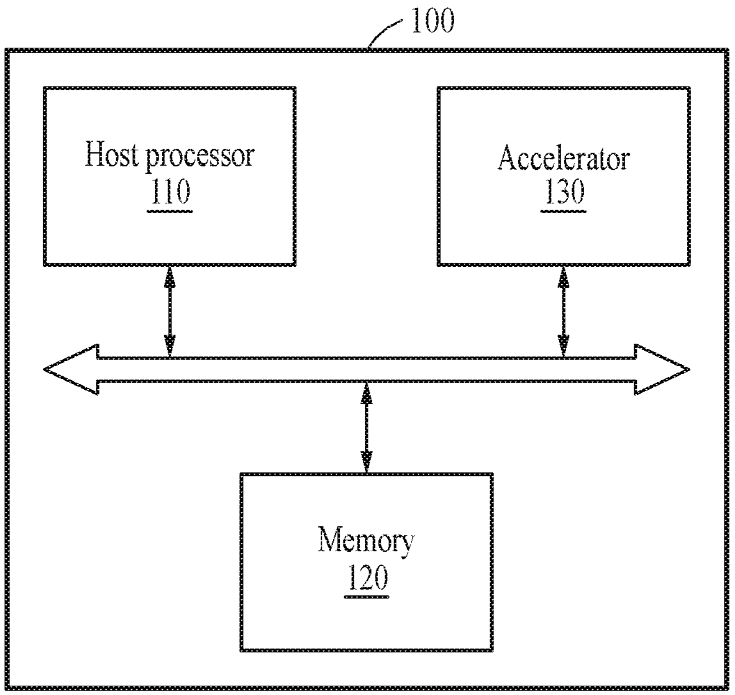
FIG. 1 illustrates an example electronic device according to one or more embodiments.

Throughout the drawings and the detailed description, unless otherwise described or provided, it may be understood that the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment (e.g., as to what an example or embodiment may include or implement) means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment", and "one or more examples" has a same meaning as "in one or more embodiments").

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

FIG. 1 illustrates an example electronic device according to one or more embodiments.

Referring to FIG. 1, in a non-limiting example, an electronic device 100 may include a host processor 110, a memory 120, and an accelerator 130. The host processor 110, the memory 120, and the accelerator 130 may communicate with each other through a bus, a network on a chip (NoC), a peripheral component interconnect express (PCIe), and the like. In the example of FIG. 1, only components related to examples described herein are illustrated in the electronic device 100. In an example, the electronic device 100 may also include other general-purpose components in addition to the components illustrated in FIG. 1.

The host processor 110 may perform overall functions for controlling the electronic device 100. The host processor 110 may execute programs and/or may control other operations or functions of the electronic device 100. The host processor 110 may be implemented as a central processing unit (CPU), a graphics processing unit (GPU), an application processor (AP), and the like, which are included in the electronic device 100, however, examples are not limited thereto.

The memory 120 may include computer-readable instructions. The host processor 110 may be configured to execute computer-readable instructions, such as those stored in the memory 120, and through execution of the computer-readable instructions, the host processor 110 is configured to perform one or more, or any combination, of the operations and/or methods described herein. The memory 120 may be hardware for storing data processed by the electronic device 100 and data to be processed by the electronic device 100. In addition, the memory 120 may store an application, a driver, and the like to be executed by the electronic device 100. Additionally, the memory 120 may store instructions executed by the host processor 110 and/or the accelerator 130. The memory 120 may include a volatile memory (e.g., dynamic random-access memory (DRAM)) and/or a non-volatile memory.

The electronic device 100 may include the accelerator 130 for performing operations. The accelerator 130 may process tasks that may be more efficiently processed by a separate exclusive processor (that is, the accelerator 130), rather than by a general-purpose host processor (e.g., the host processor 110), due to characteristics of the tasks. Here, at least one processing element (PE) included in the accelerator 130 may be utilized. The accelerator 130 may be, for example, a neural processing unit (NPU), a tensor processing unit (TPU), a digital signal processor (DSP), a GPU, a neural engine, and the like that may perform an operation according to a neural network.

The operating method of a processor described hereinafter may be performed by the host processor 110 or the accelerator 130.

The processor may extract a plurality of images from a video. The plurality of images may be image frames in the video. The plurality of images may be extracted from the video by various methods. The processor may extract initial feature maps from the plurality of images using a transformer. The transformer may be, for example, a vision transformer. The processor may generate a target feature map from the initial feature maps using a feature fusion network, which fuses the initial feature maps. The feature fusion network may include at least one layer. The feature fusion network may fuse the initial feature maps with the target feature map through the at least one layer. The processor may identify an object in the video based on the target feature map.

Re-identification (Re-ID) performed by the electronic device 100 is described next.

Figure 2:
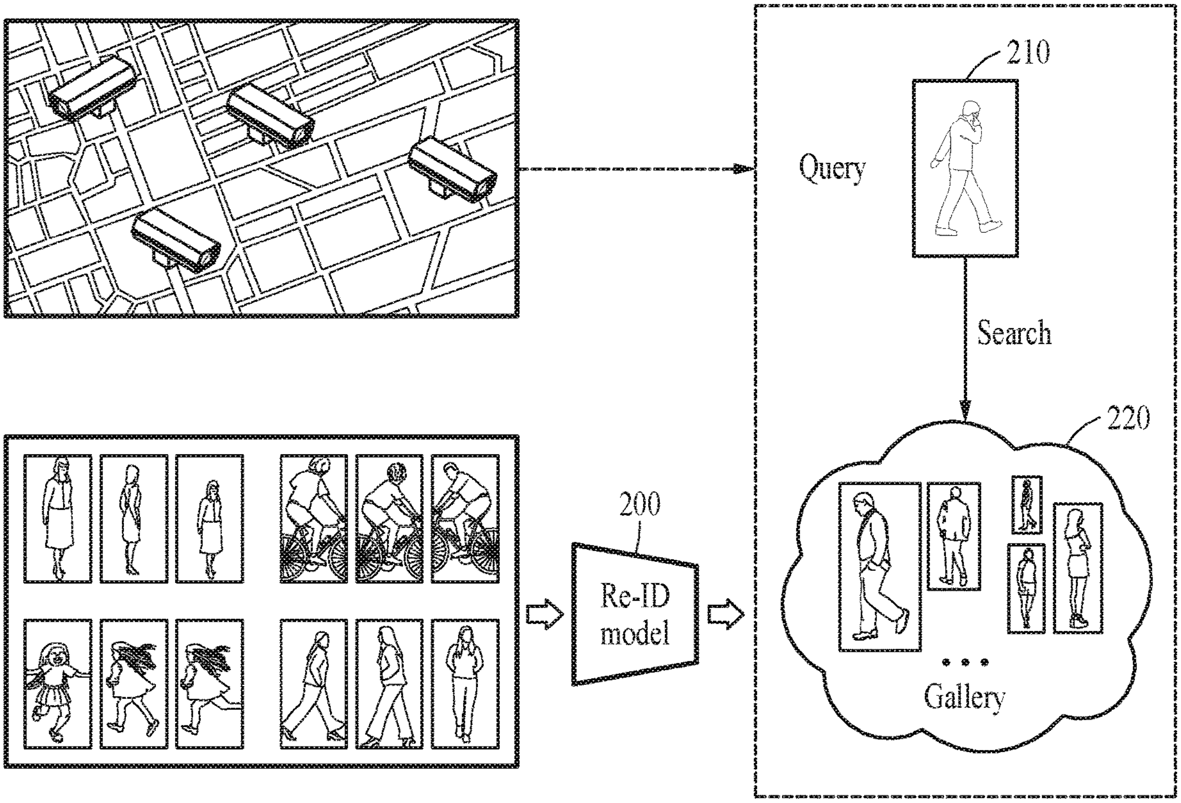
FIG. 2 illustrates an example re-identification (Re-ID) process according to one or more embodiments.

FIG. 2 illustrates an example Re-ID process according to one or more embodiments.

Referring to FIG. 2, multiple cameras may be arranged such that coverage ranges of the respective cameras do not overlap with each other. In other words, the cameras may capture different respective physical spaces each of which does overlap with any other. A Re-ID model 200 may be a model learned using an annotated person image and a video. The annotated person image and the video may be a person image and video annotated to an images and videos captured by the cameras. When a person of interest 210 is queried, an image including the person of interest 210 may be extracted from a gallery 220. To that end, given the person of interest 210 and the gallery 220, the Re-ID model 200 may extract a feature representation. Then, the image including the person of interest 210 may be extracted from the gallery 220 using query-gallery similarities. That is, similarity scores may be computed between the extracted feature representation and feature representations of the respective images in the gallery; the image including the person of interest 210 that is extracted may be the image in the gallery having the highest such similarity score.

A previous Re-ID system may extract a time domain feature (intra-frame feature) separately from a spatial domain feature (inter-frame feature). Accordingly, a spatial domain feature related to time may not be extracted, which may cause an extracted global feature to not sufficiently reflect an image and/or video. Hereinafter, examples of methods that may improve the accuracy of object identification by simultaneously extracting a time domain feature and a spatial domain feature so that a global extracted feature sufficiently reflects the content of the image and/or video.

Figure 3:
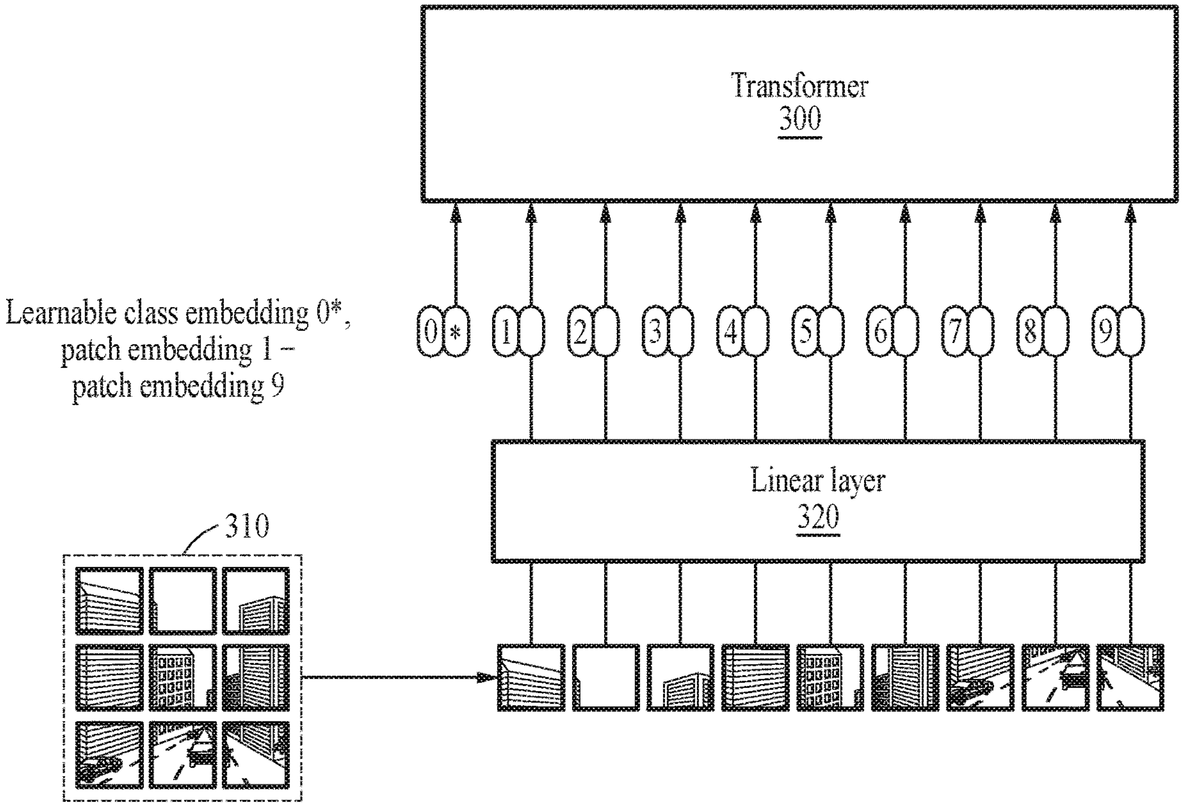
FIG. 3 illustrates an example transformer according to one or more embodiments.

FIG. 3 illustrates an example transformer according to one or more embodiments.

Before describing FIG. 3, an example prior convolution neural network (CNN) is described. The prior CNN may extract a global feature of a person from consecutive frames of a video. The extracted global (overall) feature of the person may be expressed as a feature vector. Here, using consecutive frames rather than only a single image frame, the appearance of a person may be reflected more completely and a global feature reflecting a richer time domain feature may be extracted. Simultaneously, the CNN may extract the spatial domain feature of each image frame and obtain the feature representation of the video by fusing the extracted spatial domain feature with the extracted time domain feature. However, the receptive field of the CNN may be limited, so the accuracy of CNN-based Re-ID may be limited. A transformer-based RE-ID model is described next.

Examples of transformers have achieved success in the field of natural language processing by processing data in a sequence format based on a self-attention mechanism. In the field of computer vision, there have been attempts to process a sequence image using a vision transformer. While the difficulty of training a transformer may be higher than that of a CNN, a transformer may solve the disadvantages presented by the limited receptive field of a CNN and may improve the accuracy of image identification, division, and classification.

Referring to FIG. 3, in a non-limiting example, an extraction of an image feature from an image 310 by a transformer 300 is illustrated. As described later, the spatial (intra-frame)

technique of FIG. 3 may be applied to each of the frames in a video segment being subjected to feature extraction.

The image 310 may be divided into patches having fixed sizes. For example, the image 310 may be divided into 3×3=9 patches. A feature of each patch may be extracted by embedding position information of the patch, and each of the position-embedded patches may be inputted to a linear layer 320 to linearly transform the patches. The output (i.e., the feature of each patch) of the linear layer 320 may be referred to as patch embedding. For understanding, the patch embedding loosely corresponds to word embedding in the field of natural language processing. When the patch embeddings and the class embedding (i.e., classification feature information) are input to the transformer 300, an image feature may be inferred and from the input and outputted from the transformer 300. The class embedding ("0*" in FIG. 3) may enable additional learning.

To summarize, the input of the transformer 300 may be data of an image that includes an object. The transformer 300 may output an overall spatial image feature, and the spatial image feature may be used, as described later, for image classification and/or identification.

In some implementations, the transformer 300 may not include any convolution operations. Accordingly, when extracting an image feature using the transformer 300, dependency on a convolution operation may be eliminated.

In the example transformer, an object identified by an electronic device includes other objects (e.g., animals and vehicles, etc.) in addition to a person captured in a video.

Figure 4:
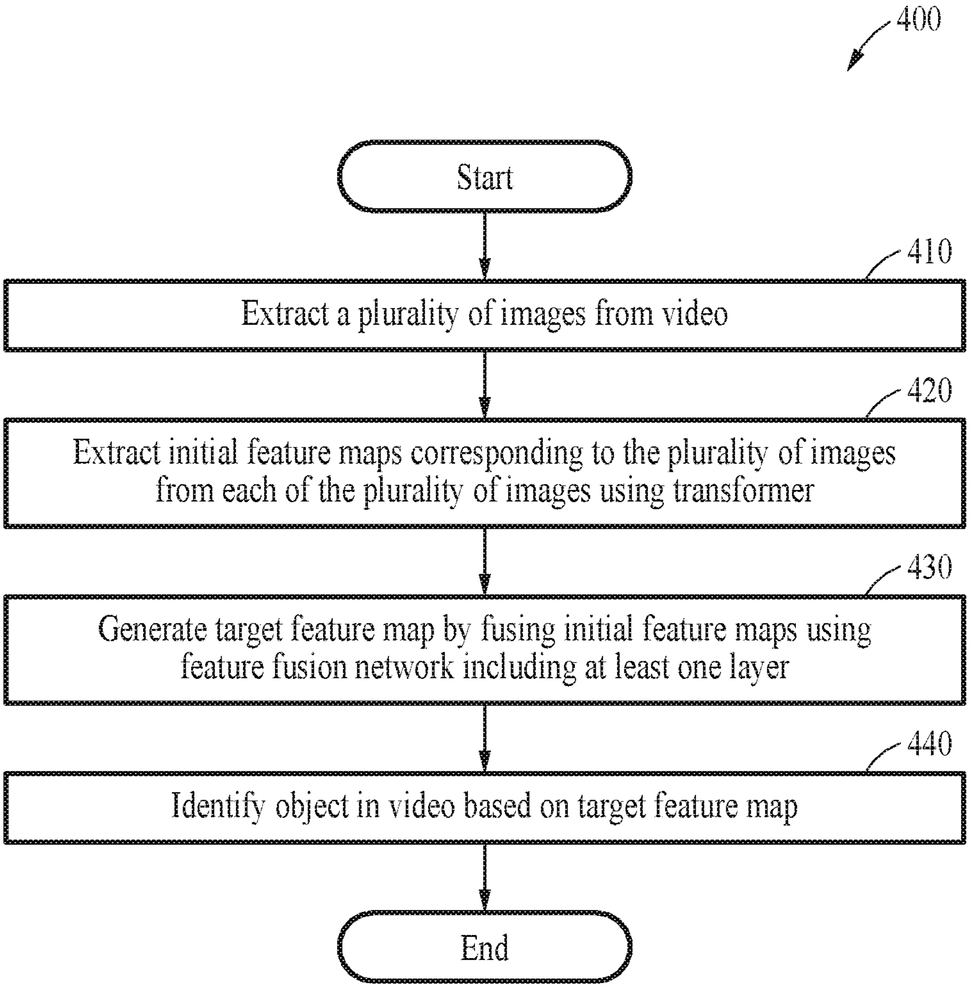
FIG. 4 illustrates an example operating method of an electronic device according to one or more embodiments.

FIG. 4 illustrates an example method of an electronic device according to one or more embodiments.

Operations illustrated in a flowchart 400 may be performed by at least one component (e.g., the processor 110 of FIG. 1 and/or the accelerator 130 of FIG. 1) of an electronic device. Referring to FIG. 4, in a non-limiting example, in operation 410, an electronic device (e.g., the electronic device 100 of FIG. 1) may extract images from a video sequence.

The electronic device may select $2^N$ images from the video sequence; N may be assumed to be 3 (i.e., N=3). However, the present disclosure is not limited thereto.

The electronic device may divide the video sequence into eight parts (segments). The electronic device may extract a total of eight images by randomly extracting one image from each of the parts. The electronic device may configure an image sequence using the extracted/selected images (e.g., eight). The image sequence may be used to represent a clip of a corresponding video (e.g., the video sequence). Since a total of eight images are extracted, notationally, the image sequence I may include images $I_0, I_1, \ldots, I_7$. The method of extracting images from the video described above is only an example, and the present disclosure is not limited thereto.

In operation 420, the electronic device may, in a non-limiting example, extract initial feature maps from the images, respectively, using a transformer.

The transformer is described above with reference to FIG. 3, and thus, a description thereof is omitted. In an example, the transformer may be a vision transformer.

The electronic device may divide each image extracted in operation 410 into 16×8=128 patches. The method of dividing each image into patches is only an example, and the present disclosure is not limited thereto. The electronic device may form 128 image tokens for an image by embedding, to each patch, position information thereof (i.e., a token of a patch may embed a position of the patch withing its corresponding image). The electronic device may output features of the respective patches of an image by inputting the image's 128 image tokens to a linear layer. That is, the electronic device may input 128 image tokens to the linear layer which output features of the respectively corresponding patches. The electronic device may input the features of the patches and the classification feature information to the transformer. This may be done for each of the extracted/selected images (e.g., $I_0 \ldots I_7$)

Referring back to the example of FIG. 3, in that example, each image is divided into 3×3=9 patches, and the electronic device inputs patch embedding 1 to patch embedding 9 and class embedding 0* to the transformer 300. The patch embedding may correspond to the feature of the patch and the class embedding may correspond to the classification feature information. The classification feature information may be learnable information. The classification feature information may indicate classification information of an image input to the transformer 300. In the example of FIG. 4, each image may be divided into 16×8=128 patches. Here, the patch embeddings input to the transformer 300 may be patch embedding 1 to patch embedding 128.

The vision transformer may include 12 cascaded transformer blocks. The number of transformer blocks is only an example, and the present disclosure is not limited thereto. The output of each transformer block may be an input of the next transformer block. Each transformer block may include a QKV self-attention module and a multi-layer perceptron module connected by a short residual skip connection. Each of the images extracted from the video may pass through a transformer according to the above-described method, and image features for the respective images may thus be obtained. That is, the electronic device may obtain the initial feature maps respectively corresponding to the images by inputting each of the images to a transformer according to the above-described method. For example, the electronic device may obtain initial feature maps $F_0, F_1, \ldots, F_7$ respectively corresponding to the images los $I_1, I_1, \ldots, I_7$.

In an example, the initial feature maps may include feature patches representing patches into the respectively corresponding images are divided and one piece of classification feature information. For example, each initial feature map may include 128 feature patches and one piece of classification feature information.

In operation 430, the electronic device may generate a target feature map by fusing the initial feature maps using a feature fusion network including at least one layer.

The feature fusion network may generate the target feature map using the initial feature maps $F_0, F_1, \ldots, F_7$ as an input. The feature fusion network may include at least one layer. The layer of the feature fusion network may include at least one feature fusion module. Each feature fusion module may include two self-attention modules and two cross-attention modules. For example, the last layer of the feature fusion network may include one feature fusion module. The fusion feature map output from the last layer may be the target feature map, which is a fusion of the initial feature maps. The method of generating the target feature map is further described in greater detail below with reference to FIGS. 6 and 7.

In operation 440, the electronic device may identify an object in the video based on the target feature map.

The electronic device may identify the object in the video based on the target feature map and a global feature vector. The method of identifying the object using the target feature map and the global feature vector is described below in reference to FIG. 5.

Figure 5:
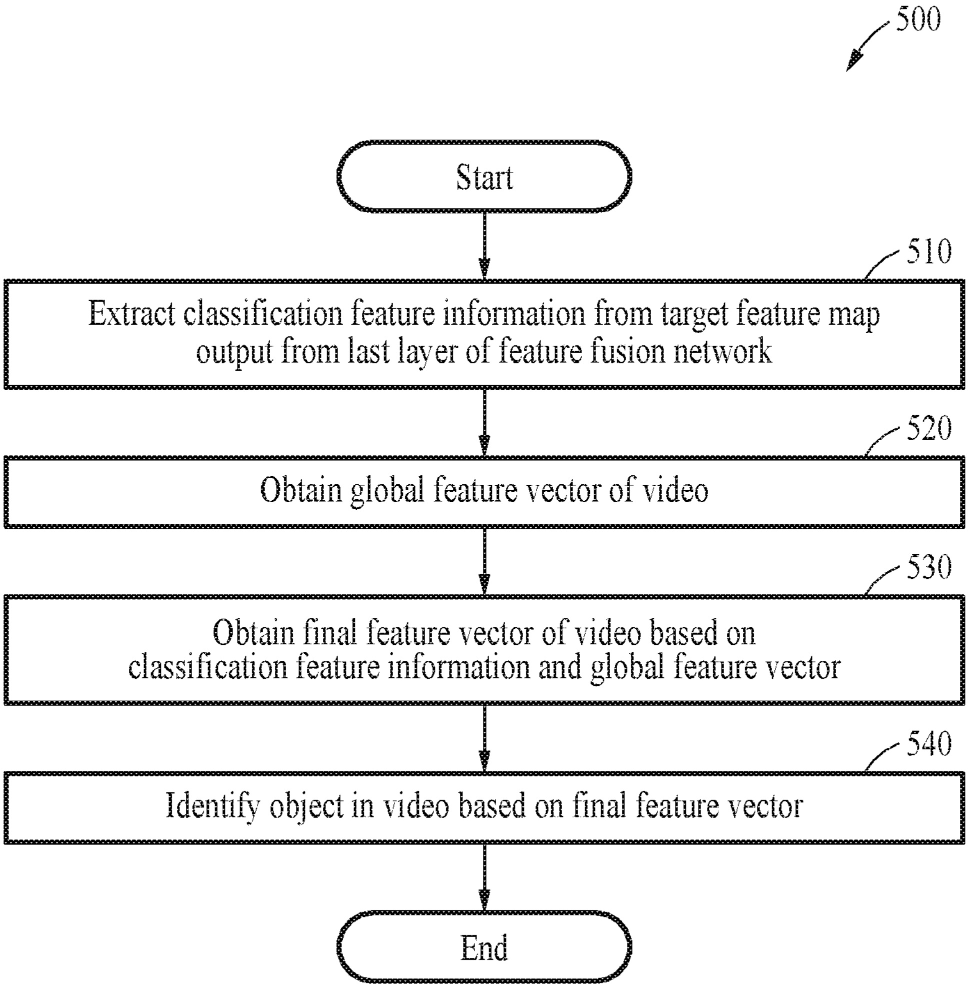
FIG. 5 illustrates an example operating method of an electronic device according to one or more embodiments.

FIG. 5 illustrates an example method of operating an electronic device according to one or more embodiments.

Referring to FIG. 5, the example operations illustrated in a flowchart 500 may be performed by at least one component (e.g., the processor 110 of FIG. 1 and/or the accelerator 130 of FIG. 1) of an electronic device.

In operation 510, the electronic device may extract classification feature information from the target feature map output from the last layer of a feature fusion network.

In operation 520, the electronic device may obtain the global feature vector of the video.

The electronic device may obtain global feature vectors for the respective images. The electronic device may obtain weights the respective global feature vectors. The electronic device may obtain the global feature vector of the video based on the weights and the global feature vectors. The methods of obtaining the weights and the global feature vector of the video is described with reference to FIG. 8.

In operation 530, the electronic device may obtain the final feature vector of the video based on the classification feature information and the global feature vector.

In operation 540, in a non-limiting example, the electronic device may identify the object in the video based on the final feature vector of the video.

The feature fusion network is described next.

Figure 6:
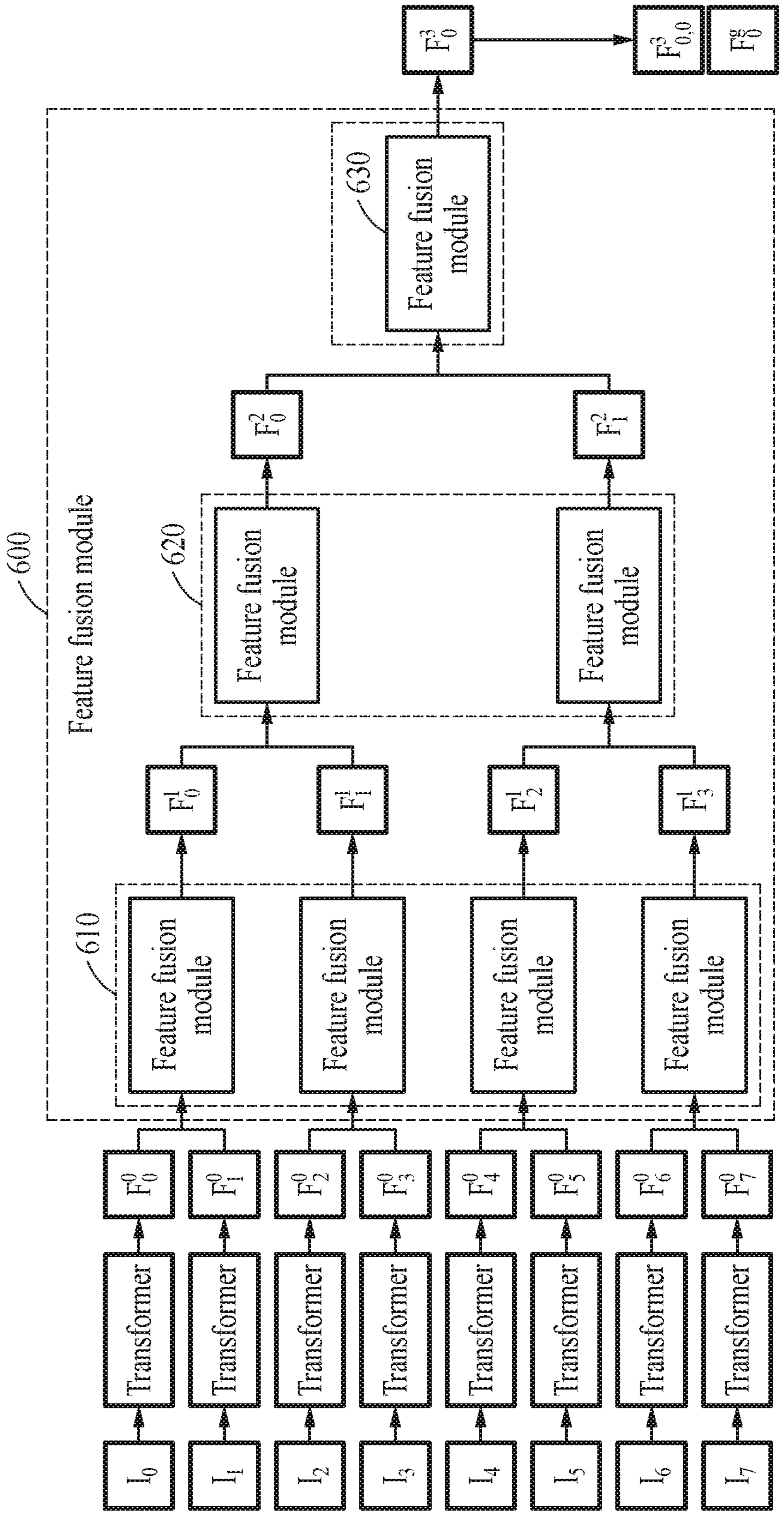
FIG. 6 illustrates an example feature fusion network according to one or more embodiments.

FIG. 6 illustrates an example feature fusion network according to one or more embodiments.

The number of layers in a feature fusion network 600 and the number of feature fusion modules in each layer described hereinafter are for convenience of description, and the present disclosure is not limited thereto. Referring to FIG. 6, in a non-limiting example, the feature fusion network 600 may output one target feature map. In this example, because $2^N$ images are selected from a video, the feature fusion network 600 may include N layers to output one target feature map by fusing $2^N$ initial feature maps by pairs. For example, when N is 3 and eight images are selected from the video, the feature fusion network 600 may include three layers; a first layer 610, a second layer 620, and a third layer 630.

Each layer may include at least one feature fusion module to fuse to input feature maps. One feature fusion module may fuse two fusion feature maps (outputs of previous fusion modules) or two initial feature maps, as the case may be. Accordingly, the number of feature fusion modules in each layer may be half of the number of feature maps input to each layer. For example, the first layer 610 may include four feature fusion modules, the second layer 620 may include two feature fusion modules, and the third layer 630 may include one feature fusion module.

In an example, the feature fusion network 600 may be connected to $2^N$ transformers. The transformers may respectively receive images $I_0, I_1, \ldots, I_7$ extracted from the video as an input. Each transformer may output an image feature (i.e., initial feature map) for its corresponding input image. The transformers having shared parameters may output the initial feature map individually.

Initial feature maps $$F_0^0, F_1^0, \ldots, F_7^0$$

may be fused in the first layer 610, and fusion feature maps $$F_0^1, F_1^1, F_2^1, F_3^1$$

may be obtained therefrom. The fusion feature maps $$F_0^1, F_1^1, F_2^1, F_3^1$$

may be fused in the second layer 620, and thus fusion feature maps $$F_0^2, F_1^2$$

may be obtained. The fusion feature maps $$F_0^2, F_1^2$$

may be fused in the third layer 630, and a target feature map $$F_0^3$$

may be obtained.

The output of each fusion layer (except the last) may be used as an input of the next fusion layer. The fusion feature maps corresponding to the output of each layer may be grouped by two and may be divided into at least one sub-set. The two fusion feature maps in each sub-set may be fused in the next layer. When the output of the next layer is one fusion feature map (e.g., the last fusion layer), the fusion feature map may be the target feature map. That is, where the next layer is the last layer of the feature fusion network 600, the output of the next layer may be determined as the target feature map.

That is, the first layer 610 may include four feature fusion modules. Each feature fusion module may output the fusion feature maps $$F_0^1, F_1^1, F_2^1 \text{ and } F_3^1$$

that are outputs from the first layer 610 by fusing sub-sets $$F_0^0-F_1^0, F_2^0-F_3^0, F_4^0-F_5^0, F_6^0-F_7^0$$

of the initial feature map. The fusion feature maps $$F_0^1, F_1^1, F_2^1 \text{ and } F_3^1$$

may be fused in the second layer 620.

The second layer 620 may include two feature fusion modules. Each feature fusion module may output the fusion feature maps $$F_0^2, F_1^2$$

that are outputs from the second layer 620 by fusing sub-sets $$F_0^1 - F_1^1, F_2^1 - F_3^1$$

of the fusion feature map. The fusion feature maps $$F_0^2, F_1^2$$

may be fused in the third layer 630.

The third layer 630 may output the target feature map $$F_0^3$$

by fusing the sub-sets $$F_0^2 - F_1^2$$

of the fusion feature map.

The classification feature information (e.g., $$F_{0,0}^3$$

of FIG. 6) may be extracted from the target feature map $$F_0^3.$$

The classification feature information may be concatenated with a global feature vector (e.g., $$F_0^g$$

of FIG. 6). The final feature vector may be generated by concatenating the classification feature information with the global feature vector (in other implementations, the final and global feature vectors may be fused with other fusion techniques). The final feature vector may be used to identify the object in the video. The method of obtaining the global feature vector is described in greater detail below with reference to FIG. 8.

Hereinafter, a method in which the feature fusion module of each layer fuses two feature maps is described.

Figure 7:
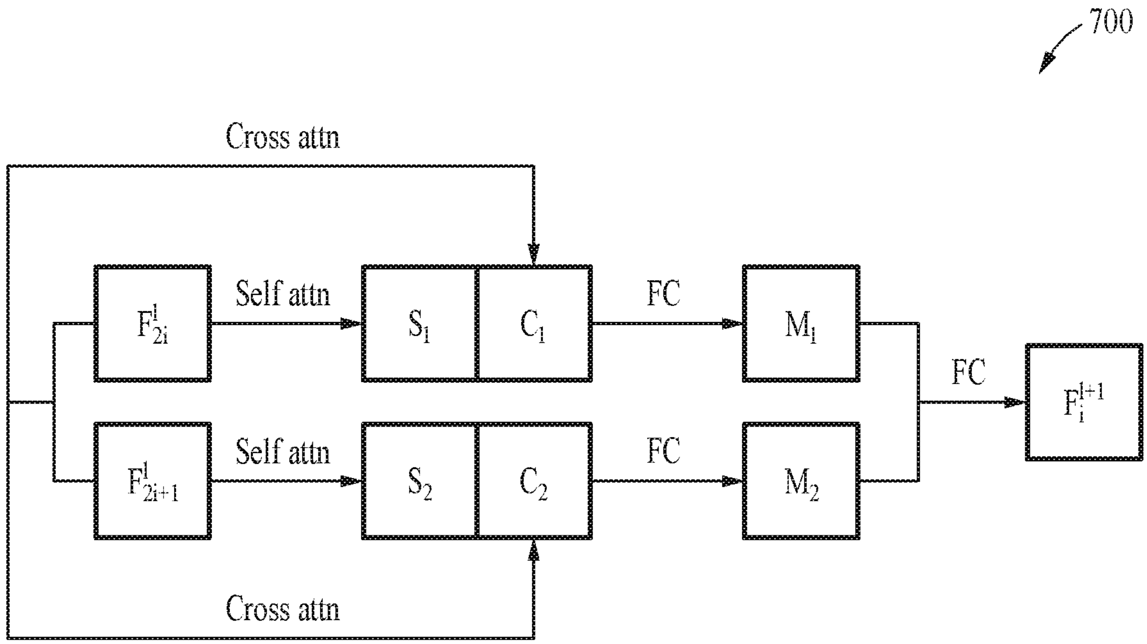
FIG. 7 illustrates an example feature fusion module according to one or more embodiments.

FIG. 7 illustrates an example feature fusion module according to one or more embodiments.

Referring to FIG. 7, a feature fusion module 700 that may serve in any of the layers of a feature fusion network is illustrated. In an example, the feature fusion module 700 may be an i+1-th feature fusion module in an l-th layer. The feature fusion module 700 may include a self-attention module and a cross-attention module. The self-attention module may be a multi-head self-attention module. The self-attention module may output a self-attention feature map of each feature map based on each feature map in a sub-set. The cross-attention module may output a cross-attention feature map of each feature map by crossing each feature map in the sub-set.

Hereinafter, for convenience of description, it is assumed that a sub-set $$F_{2i}^l - F_{2i+1}^l$$

is input to the feature fusion module 700. The feature map $$F_{2i}^l$$

and the feature map $$F_{2i+1}^l$$

may be the initial feature map or the fusion feature map.

The self-attention module may obtain each of a self-attention feature map $$SA_{2i}^l$$

(i.e., $S_1$ of FIG. 7) of the feature map $$F_{2i}^l$$

and a self-attention feature map $$SA_{2i+1}^l$$

(i.e., $S_2$ of FIG. 7) of the feature map $$F_{2i+1}^l$$

based on Equations 1 and 2 below.

$$SA_{2i}^l = MSA(Q_{2i}^l, K_{2i}^l, V_{2i}^l) \quad \text{Equation 1}$$

$$SA_{2i+1}^l = MSA(Q_{2i+1}^l, K_{2i+1}^l, V_{2i+1}^l) \quad \text{Equation 2}$$

MSA denotes multi-head attention processing.

$$Q_{2i}^l, K_{2i}^l \text{ and } V_{2i}^l$$

may denote a query vector, a key vector, and a value vector of the feature map $$F_{2i}^l$$

used for the multi-head attention processing, respectively.

$Q_{2i+1}^{l}$, $K_{2i+1}^{l}$, and $V_{2i+1}^{l}$ denote a query vector, a key vector, and a value vector of the feature map $F_{2i+1}^{l}$ used for the multi-head attention processing, respectively. The feature map $F_{2i}^{l}$ and the feature map $F_{2i+1}^{l}$ may pass through the same QKV projection module, so the query vector, the key vector, and the value vector corresponding to the feature map $F_{2i}^{l}$ and the feature map $F_{2i+1}^{l}$ may be obtained.

The self-attention module may be a multi-head attention module. In the multi-head attention module, the calculation for one head among self-attention blocks may be expressed by Equation 3. Here, $d_k$ denotes dimensions of k vectors.

$$MSA(Q, K, V) = softmax\left(\frac{QK^T}{\sqrt{d_k}}\right)V \quad \text{Equation 3}$$

The fusion feature module 700 may obtain a cross-attention feature map $CA_{2i}^{l}$ (i.e., $C_1$ of FIG. 7) of the feature map $F_{2i}^{l}$ and a cross-attention feature map $CA_{2i+1}^{l}$ (e.g., $C_2$ of FIG. 7) of the feature map $F_{2i+1}^{l}$ using the cross-attention module, based on Equations 4 and 5, shown below. That is, in the multi-head attention block used to calculate the self-attention feature map to calculate the cross-attention feature map $CA_{2i}^{l}$, the key vector and the value vector may be replaced with $K_{2i+1}^{l}$ and $V_{2i+1}^{l}$, respectively. Likewise, in the multi-head attention block used to calculate the self-attention feature map to calculate the cross-attention feature map $CA_{2i+1}^{l}$, the key vector and the value vector may be replaced with $K_{2i}^{l}$ and $V_{2i}^{l}$, respectively.

$$CA_{2i}^{l} = MSA(Q_{2i}^{l}, K_{2i+1}^{l}, V_{2i+1}^{l}) \quad \text{Equation 4}$$

$$CA_{2i+1}^{l} = MSA(Q_{2i+1}^{l}, K_{2i}^{l}, V_{2i}^{l}) \quad \text{Equation 5}$$

The calculation to obtain the self-attention feature map of each feature map in the sub-set may be independent from each other. Accordingly, the self-attention feature map of each feature map may independently represent the features of one object. However, the features of one object represented by the self-attention feature map of each feature map may be slightly different. For example, when the viewing angle or occlusion position of each image on which each feature map is based is different, the features of one object represented by the self-attention feature map of each feature map may be slightly different.

Accordingly, when the features of one object represented by the self-attention feature map of each feature map understand and recognize each other, the feature representation representing that one object may be improved through mutual complementation. In an example, the above-described objective may be achieved by exchanging the key vector and the value vector corresponding to each feature map.

In addition, the interrelationship between the feature maps at the longer time axis may be obtained by using the method of fusing the feature maps in stages and by using an attention mechanism of the transformer when fusing the feature maps. Through this, the extracted feature may more completely reflect the content of the video.

The fusion feature module 700 may output the fusion feature map based on the self-attention feature map and the cross-attention feature map of each feature map in the sub-set. The fusion feature map may be the output of the fusion feature module 700.

The fusion feature module 700 may concatenate the self-attention feature map with the cross-attention feature map of each feature map in the sub-set. The fusion feature module 700 may generate a self-attention-cross-attention feature map by fully connecting the self-attention feature map to the cross-attention feature map of each feature map.

In an example, the fusion feature module 700 may concatenate the self-attention feature map $$SA_{2i}^{l}$$

with the cross-attention feature map $$CA_{2i}^{l}$$

of the feature map $$F_{2i}^{l}$$

based on Equations 6 and 7 below. The fusion feature module 700 may generate a self-attention-cross-attention feature map $$MA_{2i}^{l}$$

(i.e., $M_1$ of FIG. 7) of the feature map $$F_{2i}^{l}$$

by fully connecting the concatenated self-attention feature map $$SA_{2i}^{l}$$

to the cross-attention feature map $$CA_{2i}^{l}.$$

The method of generating a self-attention-cross-attention feature map $$MA_{2i+1}^{l}$$

(i.e., $M_2$ of FIG. 7) of the feature map $$F_{2i+1}^{l}$$

may be the same as the method of generating the self-attention-cross-attention feature map $$MA_{2i}^{l}$$

of the feature map $$F_{2i}^{l}$$

described above.

$$MA_{2i}^{l} = FC_{2d}^{d}(concat(SA_{2i}^{l}, CA_{2i}^{l})) \quad \text{Equation 6}$$

$$MA_{2i+1}^{l} = FC_{2d}^{d}(concat(SA_{2i+1}^{l}, CA_{2i+1}^{l})) \quad \text{Equation 7}$$

The fusion feature module 700 may concatenate the self-attention-cross-attention feature maps of each feature map and output the fusion feature map by fully connecting the concatenated self-attention-cross-attention feature maps.

In an example, the fusion feature module 700 may concatenate the self-attention-cross-attention feature map $$MA_{2i}^{l}$$

of the feature map $$F_{2i}^{l}$$

with the self-attention-cross-attention feature map $$MA_{2i+1}^{l}$$

of the feature map $$F_{2i}^{l}$$

and output a fusion feature map $$F_{i}^{l+1}$$

by fully connecting the concatenated self-attention-cross-attention feature maps based on Equation 8 below.

$$F_{i}^{l+1} = FC_{2d}^{d}(concat(MA_{2i}^{l}, MA_{2i+1}^{l})) \quad \text{Equation 8}$$

In the above-described Equations, d denotes the dimension of each feature patch of the feature map.

The fusion feature map $$F_i^{l+1}$$

may be an output of the i+1-th feature fusion module 700 in the l-th layer. The fusion feature map $$F_i^{l+1}$$

may form a sub-set with a fusion feature map $$F_{i+1}^{l+1}$$

and may be input to the next layer. When the l-th layer is the last layer, the fusion feature map $$F_i^{l+1}$$

may be output as the target feature map.

The target feature map may be a fusion of classification feature information. The electronic device (e.g., electronic device 100 of FIG. 1) may extract the classification feature information to identify the object in the video from the target feature map. For example, referring to FIG. 6, the electronic device may extract classification feature information $$F_{0,0}^3$$

from a target feature map $$F_0^3.$$

The electronic device may identify the object in the video based on the classification feature information. The electronic device may identify the object in the video based on the classification feature information and a global feature vector (e.g., the global feature vector $$F_0^g$$

)). Hereinafter, a method of obtaining the global feature vector is described.

Figure 8:
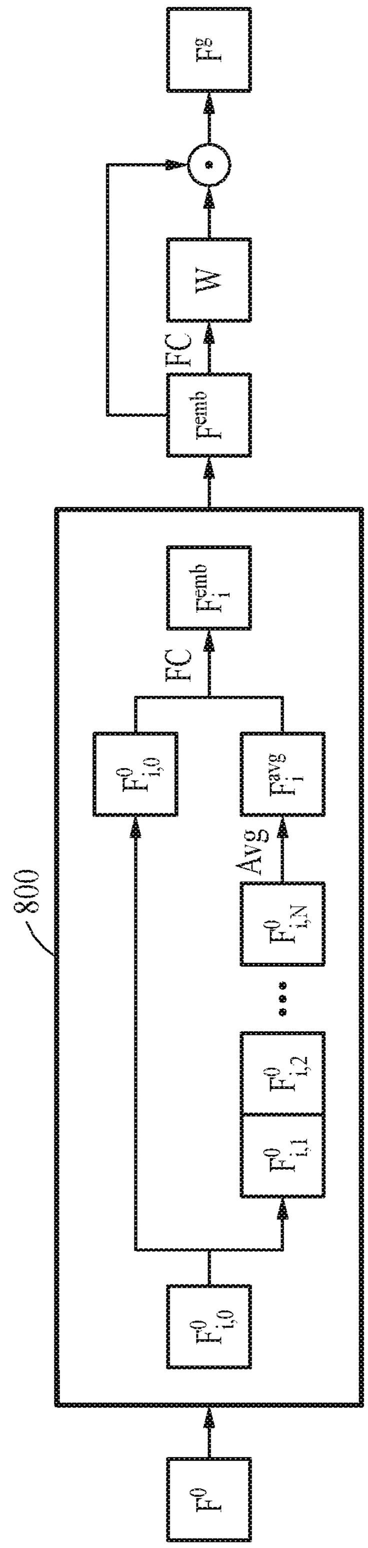
FIG. 8 illustrates an example method of extracting a global feature vector according to one or more embodiments.

FIG. 8 illustrates an example method of extracting a global feature vector according to one or more embodiments.

Referring to FIG. 8, the electronic device may obtain the final feature vector based on the classification feature information extracted from the target feature map and the global feature vector. The electronic device may identify the object in the video based on the final feature vector.

The electronic device may obtain global feature vectors for the respective images extracted from the video. The electronic device may obtain the global feature vector of the video based on the global feature vectors of the respective images. The electronic device may perform a weighted average on the global feature vectors of the images.

The electronic device may obtain the weights of the respective global feature vectors of the images through linear mapping. In an example, the electronic device may normalize the weights of the global feature vectors of the images obtained using a SoftMax function to obtain weights for use in the weighted average. Different functions may be applied to obtain the weights.

In a non-limiting example, the electronic device may obtain the global feature vector for each image extracted from the video using an embedding module 800. For example, referring to FIG. 6, the initial feature maps $$F_0^0, F_1^0, \ldots, F_7^0$$

may each include 128 feature patches and one classification feature information. In FIG. 8, the embedding module 800 may calculate the average of the feature patches in the initial feature map and obtain an average feature patch $$F_i^{avg}$$

according to Equation 9 below. The obtaining of the average feature patch $$F_i^{avg}$$

of the image described above may be performed on each image extracted from the video.

$$F_i^{avg} = \frac{\sum_{j=1}^{128} F_{i,j}^0}{128} \qquad \text{Equation 9}$$

In Equation 9, the value 128 (i.e., the max of j) is applied because each image was divided into 128 patches, and thus the present disclosure is not limited thereto. i corresponds to the number of images divided from the video. For example, i may be 0 to 7.

The embedding module 800 may obtain a global feature vector $$F_i^{emb}$$

of each image according to Equation 10, as shown below. For example, the embedding module 800 may concatenate the average feature patch $$F_i^{avg}$$

with one classification feature information $$F_{i,0}^0.$$

The embedding module 800 may obtain the global feature vector $$F_i^{emb}$$

of an image by fully connecting the concatenated average feature patch $$F_i^{avg}$$

to the classification feature information $$F_{i,0}^{0}.$$

The obtaining of the global feature vector for the image described above may be performed on each of the images extracted from the video (e.g., eight images).

$$F_i^{emb} = FC_{2d}^{d}\left(concat\left(F_{i,0}^{0}, F_i^{avg}\right)\right) \quad \text{Equation 10}$$

The electronic device may obtain a weight $w_i$ for the global feature vector of each image through linear mapping based on Equation 11 below.

$$w_i = FC_d^{1}\left(F_i^{emb}\right) \quad \text{Equation 11}$$

The electronic device may normalize weights $w_0, w_1, \ldots, w_7$ for the global feature vector of each image obtained based on Equation 12 below using a SoftMax function, so the weight w for use in the weighted average may be obtained.

$$w = Softmax(\{w_0, w_1, \ldots, w_7\}) \quad \text{Equation 12}$$

The global feature vector of the video is the sum of the global feature vectors of weighted images and may be obtained based on Equation 13 below.

$$F^g = wF^{emb} \quad \text{Equation 13}$$

The global feature vector of the video may be supplementary information of the classification feature information extracted from the target feature map. The electronic device may obtain the final feature vector from the classification feature information extracted from the target feature map and the global feature vector of the video.

The electronic device may concatenate the final feature vectors from the classification feature information extracted from the target feature map (resulting from the fusions) and the global feature vector of the video, so the final feature vector may be obtained as shown in Equation 14 below.

$$F = concat\left(F^g, F_{0,0}^{3}\right) \quad \text{Equation 14}$$

The global feature vector of the video may be extracted based on an attention mechanism rather than a CNN. Accordingly, the disadvantages of the limited receptive field of a CNN may be avoided.

In an example, training supervision using a classification loss function and label smoothing may be performed on a global feature vector $F^g$ and classification feature information $$F_{i,0}^{l}$$

to train a network used to obtain the global feature vector of the video. The classification feature information $$F_{i,0}^{l}$$

may be included in the output of each layer of the feature fusion network. Additionally, the triplet loss of hard example mining may be used to train the network used to obtain the global feature vector of the video to make the global feature vector more distinct in a feature space.

In an example, the loss function may be expressed by Equation 15 below.

$$\mathcal{L} = \mathcal{L}_{cls}(C^g) + \mathcal{L}_{triplet}(F^g) + \sum_{l=0}^{3}\sum_{i=0}^{2^{3-l}-1}\left(\mathcal{L}_{cls}\left(C_{i,0}^{l}\right) + \mathcal{L}_{triplet}\left(F_{i,0}^{l}\right)\right) \quad \text{Equation 15}$$

In equation 15, $C^g$ may be $$FC_d^{class}$$

$(F^g)$ (i.e., $C^g$=

$$\left(\text{i.e., } C^g = FC_d^{class}(F^g)\right).$$

$(F^g)$).

$$C_{i,0}^{l}$$

may be $$FC_d^{class}\left(F_{i,0}^{l}\right)$$

(i.e., $$\left(\text{i.e., } C^{l}_{i,0} = FC^{class}_{d}\left(F^{l}_{i,0}\right)\right).$$

$C^g$ represents the classification reliability of the prediction obtained by inputting a second global feature vector to a fully connected layer.

$$C^{l}_{i,0}$$

represents the classification reliability of the prediction obtained by inputting the classification feature information for each layer of the feature fusion network to the fully connected layer.

The electronic device 100, host processor 110, memory 120, accelerator 130, transformer 300, feature fusion module, and embedding module 800 described herein and disclosed herein described with respect to FIGS. 1-8 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method, the method comprising:
- extracting initial feature maps from respective images extracted from a video, wherein the extracting of the initial features maps is performed using a transformer;
- generating a target feature map by fusing the initial feature maps using a feature fusion network comprising one or more layers; and
- identifying an object in the video based on the target feature map, wherein the identifying of the object in the video comprises:
- extracting classification feature information from the target feature map output from a last layer of the feature fusion network; and
- obtaining a final feature vector of the video based on the classification feature information and a global feature vector of the video,
- wherein the global feature vector comprises supplementary information of the classification feature information extracted from the target feature map.

2. The method of claim 1, wherein the identifying of the object in the video comprises:
- obtaining the global feature vector of the video; and
- identifying the object in the video based on the final feature vector.

3. The method of claim 2, wherein the obtaining of the global feature vector of the video comprises:
- obtaining global feature vectors of the respective images;
- obtaining weights for of the respective global feature vectors; and
- obtaining the global feature vector of the video based on the weights and the global feature vectors.

4. The method of claim 1, wherein the one or more layers comprise one feature fusion module and fusion feature maps corresponding to an output of a current layer,
- wherein an input of a next layer comprise the fusion feature maps, and
- wherein the fusion feature maps are cascaded with the current layer.

5. The method of claim 1, wherein the generating of the target feature map comprises:
- grouping fusion feature maps corresponding to an output of a current layer into groups of two;
- dividing the fusion feature maps into one or more sub-sets;
- inputting the one or more sub-sets to a next layer; and
- setting an output of the next layer as the target feature map when the next layer is a last layer of the one or more layers.

6. The method of claim 1, wherein the one or more layers comprise feature fusion modules, each feature fusion module comprising:
- a self-attention module configured to output a self-attention feature map from each fusion feature map in an input sub-set; and
- a cross-attention module configured to output a cross-attention feature map by crossing a fusion feature map in the input sub-set.

7. A processor-implemented method, the method comprising:
- extracting a plurality of images from a video;
- extracting initial feature maps from respective images extracted from a video, wherein the extracting is performed using a transformer;
- generating a target feature map by fusing the initial feature maps using a feature fusion network comprising one or more layers;
- extracting classification feature information from the target feature map:
- obtaining a global feature vector of the video, wherein the global feature vector comprises supplementary information of the classification feature information extracted from the target feature map; and
- identifying an object in the video based on the target feature map and the global feature vector.

8. The method of claim 7, wherein the global feature vector is obtained from a weighted average of global feature vectors extracted from the respective images.

9. A non-transitory computer-readable storage medium storing instructions that, when executed by a processor, cause the processor to perform the operating method of claim 1.

10. An electronic device, comprising:
- one or more processors configured to execute instructions; and
- a memory storing the instructions, wherein execution of the instructions configures the processors to:
  - extract a plurality of images from a video,
  - extract initial feature maps from respective images extracted from a video, wherein the extracting of the initial features maps is performed using a transformer;
  - generate a target feature map by fusing the initial feature maps using a feature fusion network comprising one or more layers; and
  - identify an object in the video based on the target feature map, wherein the identifying of the object in the video comprises:

extracting classification feature information from the target feature map output from a last layer of the feature fusion network; and obtaining a final feature vector of the video based on the classification feature information and a global feature vector of the video, wherein the global feature vector comprises supplementary information of the classification feature information extracted from the target feature map.

11. The electronic device of claim 10, wherein the processors are further configured to:

obtain the global feature vector of the video; and identify the object in the video based on the final feature vector.

12. The electronic device of claim 11, wherein the processors are further configured to:

obtain global feature vectors of the respective images; obtain weights for the respective global feature vectors; and obtain the global feature vector of the video based on the weights and the global feature vectors.

13. The electronic device of claim 10, wherein the one or more layers comprise a feature fusion module and fusion feature maps corresponding to an output of a current layer, and wherein an input of a next layer comprises the fusion features maps and is cascaded with the current layer.

14. The electronic device of claim 10, wherein the processors are further configured to:

group fusion feature maps corresponding to an output of a current layer into groups of two;

divide the fusion feature maps into one or more sub-sets;

input the one or more sub-sets to a next layer; and set an output the next layer as the target feature map when the next layer is a last layer of the one or more layers.

15. The electronic device of claim 10, wherein the one or more layers comprise feature fusion modules, each feature fusion module comprising:

a self-attention module configured to output a self-attention feature map from each fusion feature map in an input sub-set; and a cross-attention module configured to output a cross-attention feature map by crossing a fusion feature map in the input sub-set.

* * * * *